United States Patent

Reinbold et al.

[11] Patent Number: 6,054,685
[45] Date of Patent: Apr. 25, 2000

[54] METHOD FOR THE ARC-LIKE SHAPING OF PROFILED STRANDS OR STRAND SECTIONS CONSISTING OF A THERMOPLASTIC MATERIAL

[76] Inventors: Theo Reinbold, Am Hagdorn 6, 75015 Bretten; Bernd Reinbold, Eigenmannstrasse 47, 75038 Oberderdingen, both of Germany

[21] Appl. No.: 09/390,646

[22] Filed: Sep. 7, 1999

Related U.S. Application Data

[63] Continuation-in-part of application No. 09/071,322, May 1, 1998.

[51] Int. Cl.$^7$ .............................. B29C 53/02; B29C 53/82
[52] U.S. Cl. ............................ 219/392; 264/313; 264/327
[58] Field of Search .................................. 219/385, 392, 219/400; 264/299, 313, 319, 327, 339, 479, 480

[56] References Cited

U.S. PATENT DOCUMENTS

| | | | |
|---|---|---|---|
| 3,868,789 | 3/1975 | Gates | 264/339 |
| 4,087,509 | 5/1978 | Gates | 264/313 |
| 4,092,390 | 5/1978 | Mulvany, Jr. | 264/94 |
| 4,160,006 | 7/1979 | Patzner et al. | 264/339 |
| 4,361,533 | 11/1982 | Jenks et al. | 264/313 |
| 4,468,190 | 8/1984 | Witte | 264/313 |
| 4,649,012 | 3/1987 | Witte | 264/313 |
| 4,786,456 | 11/1988 | Witte | 264/313 |
| 5,320,700 | 6/1994 | Hall et al. | 264/258 |
| 5,516,479 | 5/1996 | Schimmelpfennig et al. | 264/339 |

FOREIGN PATENT DOCUMENTS

| | | |
|---|---|---|
| 2053318 | 5/1974 | Germany . |
| 2739548 | 7/1979 | Germany . |
| 3322572 | 12/1984 | Germany . |
| 3406729 | 9/1985 | Germany . |
| 1375597 | 11/1974 | United Kingdom . |

*Primary Examiner*—Joseph Pelham
*Attorney, Agent, or Firm*—Klaus J. Bach

[57] ABSTRACT

In a method for the arc-like shaping of an extruded profiled strand of plastic material at least a section of the strand is heated in a hot air chamber together with a support ledge disposed in spaced relationship from the profiled strand to a temperature permitting the bending of the profiled strand and the strand is then firmly engaged between a support ledge at the inner compression side and a support profile at the other, that is the tension side of the profile strand to form a package, which is then bent. Preferably, the temperature at the compression side of the profile strand is higher than the temperature at the tension side thereof to prevent the formation of waves in the profile strand walls. The profile strand may be surrounded by support profile members, which are heated together with the profile strand. The support profile members are held in engagement with profile strand by auxiliary support profiles, which are held together and which are flexible to permit bending of the whole package.

9 Claims, 3 Drawing Sheets

METHOD FOR THE ARC-LIKE SHAPING OF PROFILED STRANDS OR STRAND SECTIONS CONSISTING OF A THERMOPLASTIC MATERIAL

This is a Continuation-in-Part application of patent application Ser. No. 09/071322 filed May 01, 1998.

BACKGROUND OF THE INVENTION

The invention resides in a method for the arc-like shaping of profiled strands or strand sections consisting of a thermoplastic material particularly hollow window frame profile strands, wherein at least the strand section to be bent is heated to a temperature permitting the shaping of the strand utilizing a heated temperature resistant support structure around which the strand section is bent and from which it is separated after being cooled and to an apparatus for performing the method.

Such methods are known in principle for example from DE 33 22 572 C2. Here, a profile strand is softened in a heat bath, pre-shaped and then bent to its final shape using shaping templates. As heating liquid in the bath, normally oil is used whose boiling temperature is higher than the softening temperature of the thermoplastic material such as PVC. To prevent the formation of waves or the buckling at the compression side, that is the radially inner side, of the profile strand to be bent, heated oil is conducted onto the strand on the bending apparatus during bending. However, the use of oil is not without problems. On one hand, vapors and deposits which may adversely affect the health of the workers are generated and, on the other hand, the shaped profile strands have to be cleaned after they cool down, which also results in problems with the disposal of the residues. A dry heating of the profile strands for example in hot air chambers as it is mentioned in DE 20 53 318, in which various heating possibilities are listed (see column 2, lines 49) would therefore be desirable. However, in practice, problems occur with heated oil operated heating baths as well as with hot air chambers since the formation of waves along the compression side of the profile strand cannot be prevented with either method, particularly with relatively tight arcs which require relatively large shape changes. Undesirable shape changes occur also at the front sides (that is, on the side disposed on the bending table and on the opposite parallel side) of the profile strands adjacent the inner profile web.

DE 27 29 548 A1 proposes to use support ledges on which the profile strands are slidably disposed during their bending while being heated. The ledges abut the profile strand essentially at all sides and consist of heat resistant profiled rubber or rubber-like materials having a relatively low bending resistance. If a PVC profile strand is supported by such a rubber profile ledge in a hot air chamber at a temperature of 110° C., the PVC profile strand can be bent as desired utilizing also a template. The rubber profile ledge can be removed after the PVC profile strand has cooled down. However, with this method, the heat-up period is relatively long, since first the rubber profile has to be thoroughly heated so that it can transmit the heat to the profile strand. It is further disadvantageous that also the side portions of the PVC profile strand are surrounded by the rubber profile. This can lead during the bending process to undesirable small pleats or waves in the compression area which are not tolerated by the customer.

It is the object of the present invention to provide a method for heating profiled strands of thermoplastic material in a hot air chamber rapidly and bending them without undesirable changes, that is without the formation of waves or buckles in the compression areas of the profile strand.

SUMMARY OF THE INVENTION

In a method for the arc-like shaping of an extruded profiled strand of plastic material at least a section of the strand is heated in a hot air chamber together with a support ledge disposed in spaced relationship from the profiled strand to a temperature permitting the bending of the profiled strand, and the strand is then firmly engaged between a support ledge at the inner compression side and a support profile at the other side, that is the tension side of the profile strand, so as to form a package, which is then bent while the temperature at the compression side of the profile strand is higher than the temperature at the tension side thereof to prevent the formation of waves in the profile strand walls.

With the method according to the invention even relatively tight arcs can be produced with smooth surfaces free of waves or ripples. Since the outside support ledge profile has no radial slots, there are furthermore no impressions on the shaped section of the profile strand. No secondary waste products are generated which must be handled separately or disposed of properly.

The invention will be described below in greater detail on the basis of the accompanying drawings.

DESCRIPTION OF A PREFERRED EMBODIMENT

Figure 1:
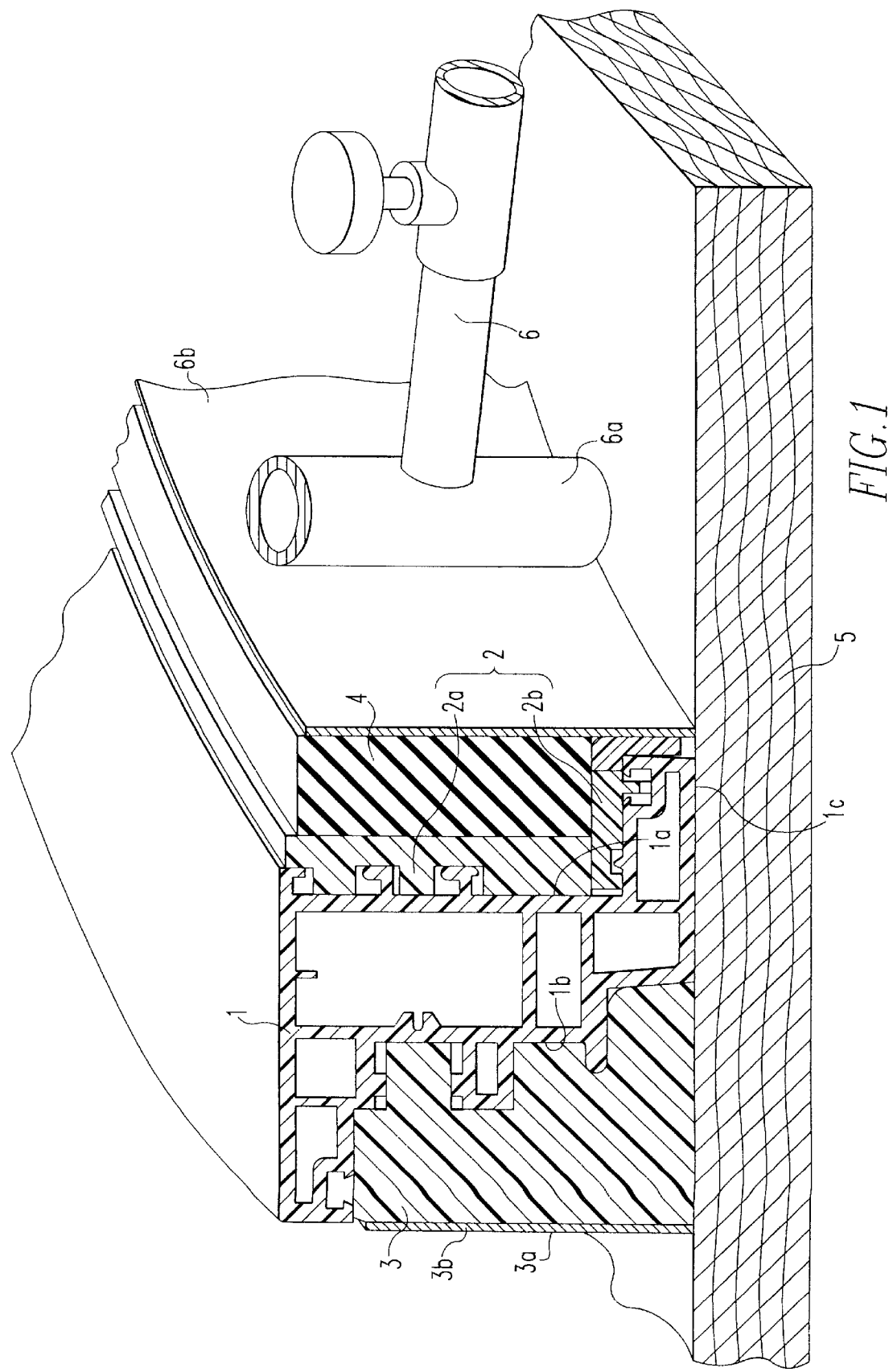
FIG. 1 shows a number of profile strands in a bending apparatus.

The profile strand package as shown in FIG. 1 consists of a profile strand 1 of thermoplastic material which in the example given is a hollow window frame strand consisting for example of PVC, an elastically bendable temperature resistant two-piece support ledge 2, a support profile 3 and a rubber support strip 4. The support ledge 2, which also consists of plastic material, for example of PTFE, is relatively thin-walled so that it can be heated as rapidly as the profile strand 1. The support profile 3 consists of an elastic smooth (that is slot-free) plastic profile rod of silicon rubber whose radially outer side (tension stress side 3a) is abutted by a steel spring band 3b. The support ledge 2 is engaged at its radially inner side by the rubber support strip 4. In the example given, the support ledge comprises two parts 2a, 2b in order to make it possible for its projection to be inserted into the respective recesses of the angled profiled strand 1.

The bending apparatus essentially corresponds to one as shown in DE 33 22 572 C2. It includes a bending table 5 on which adjustable struts 6 are disposed. The adjustable struts 6 have heads 6a, which determine the arc curvature of a spring steel strip 6b serving as a template.

The section of the profile strand to be bent is heated in the hot air heating chamber together with the two parts 2a, 2b, of the support ledge 2, which however are not yet assembled until a shaping temperature is reached which for PVC is about 110 to 120° C. The steel band backed plastic support profile 3 is also heated, but only to a temperature of, for example, 70° C.

As a result, after form-locking engagement the neutral area of the profile strand section to be bent is moved radially outwardly toward the tension stress side 1b. After heating, all the profiles or ledges 1, 2, 3, 4 are joined, while still being straight, into a form-locking state and are held in this state using U-clamps. As apparent from FIG. 1, this is done in such a way that the two piece support ledge 2a, 2b is brought into engaging contact with the radially inner side (compression side 1a) of the profile strand 1. The rubber support strip 4 which is not heated serves as a reinforcement structure for the support ledge pieces 2a, 2b. The hollow spaces of the profile strand 1 can be filled with a form-stabilizing material.

The support profile 3 engages the profile strand 1 along the outer side (tension stress side 1b). Then the whole profile strand support ledge and support profile and strip package 1 to 4 is transferred from the heating chamber to the bending table 5 of a bending apparatus and the heated section is bent around the spring steel strip 6b forming a template. The spring steel band 3b of the profiled support ledge 3 has its opposite ends mounted onto the bending table 5 and is pulled around the steel strip 6b in this process. The bending lasts only for a few seconds; then the profile strand is plane-pressed on the table 5 in a well known manner. After cool-down and solidification of the profile strand 1, the parts 2 to 4 are removed. The support ledge 2, the support profile 3 and the rubber support strip 4 return to their straight state and are again used for the forming of the next profile strand 1.

Figure 2:
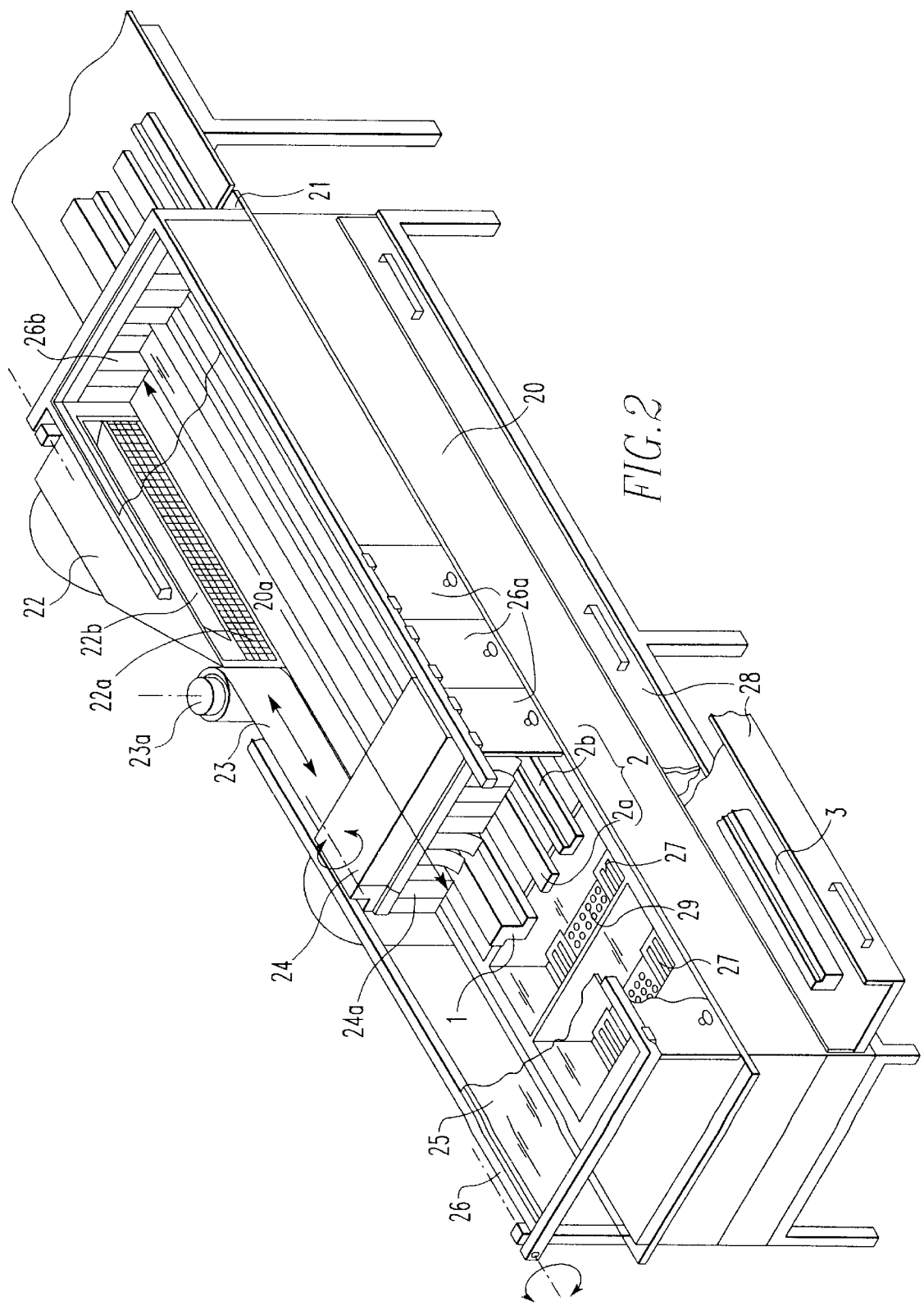
FIG. 2 is a perspective view of a profile strand heating apparatus.

The air heat apparatus as shown in FIG. 2 has the shape of an elongated box 20 mounted onto a support structure. For receiving the profile strand 1 and the support ledge 2 (ledge pieces 2a, 2b) a support plate 21 of glass or ceramic on which a parting compound is disposed is provided. The rear longitudinal side of the box 20 is formed by several registers 22a of a hot air inlet 22 and a steel band 23 unrolled from a steel band coil 23a disposed adjacent the register area. At the free end of the band 23, there is an air discharge box 24 which can be flipped open and which is movable along the support plate 21. By moving the air discharge box 24 on a guide track arranged behind the table the effective heating zone 20a can be steplessly adjusted along the profile strand 1. Instead of the steel band 23 that can be rolled onto or from the coil 23a foldable or telescope-like slidable side walls can be used. The air sucked off by way of the air discharge box 24 is heated externally and, by way of a blower (not shown), returned to the hot air inlet 22. The upper cover plate 25, which consists of glass and the longitudinal front side, are part of a pivotable box lid 26. The longitudinal front side comprises a number of pivot flaps 26a, which are disposed side-by-side and hinged to the box lid 26, so that they are pivotable about a horizontal axis. When the box lid 26 is opened, the heated profile strands can be moved from the support plate 21 to the adjacent bending table plate 5 of the bending apparatus. The parting compound such as a self-adhesive foil remains on the support plate 21.

The end walls of the box 20, which determine the heating length 20a, are formed by elastic members 24a and 26b, which are attached to the air discharge box 24 and, respectively, the lid 26. The end walls have free ends in contact with the support plate 21 or, respectively, the profile strand 1, and the support ledge and profile 2 to contain the heated air. The flaps 26a provide for access to the profile strand 1, outside the heating area 20a even when the lid 26 is closed.

Below the support plate 21, there are provided infrared radiation heaters 27 with which the undersides of the profile strands 1, and the ledge 2 are heated in the heating zone 20a. Below the infrared radiation heaters 27, there is a drawer 28 for receiving the support ledge profile 3. Between the drawer 28 and the infrared radiation heaters 27, there is a foraminated plate 29 through which sufficient radiation heat passes for heating the support profile 3 disposed in the drawer.

The air inlet nozzle 22 includes at least one guide plate 22b, which is tiltable about a horizontal axis and which deflects a part of the heated air toward the upper cover plate 25. As a result, the air is guided toward the front side of the profile strand 1 (compression side 1a), which consequently is heated to a greater degree than the rear side (tension side 1b). The temperature of the profile strand bottom side 1c (see FIG. 1) is determined by the power output of the infrared radiation heaters 27.

Figure 3:
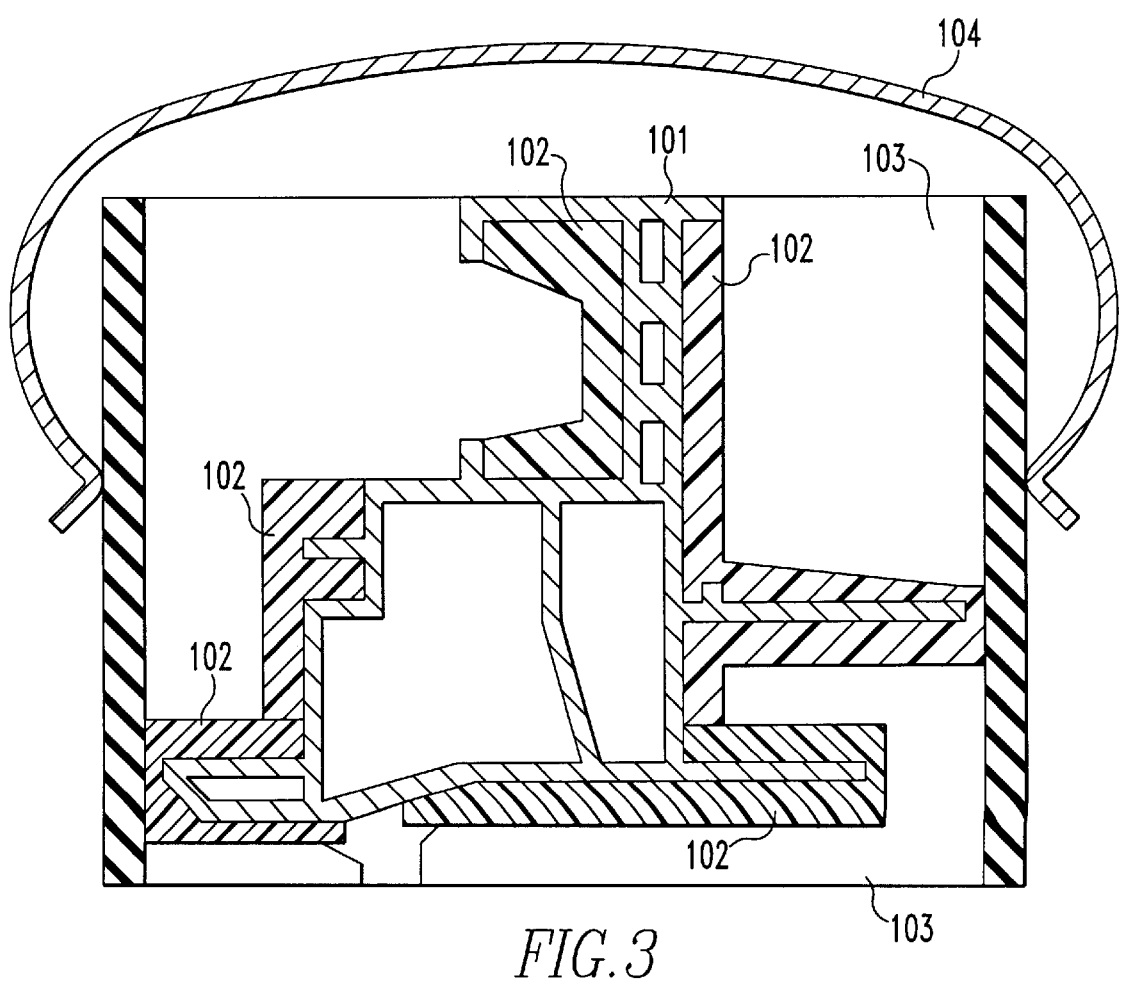
FIG. 3 is a cross-sectional view showing a profile strand packaged for bending.

FIG. 3 is a cross-sectional view of a particularly advantageous arrangement for packaging a profiled strand before it is bent.

Figure 4:
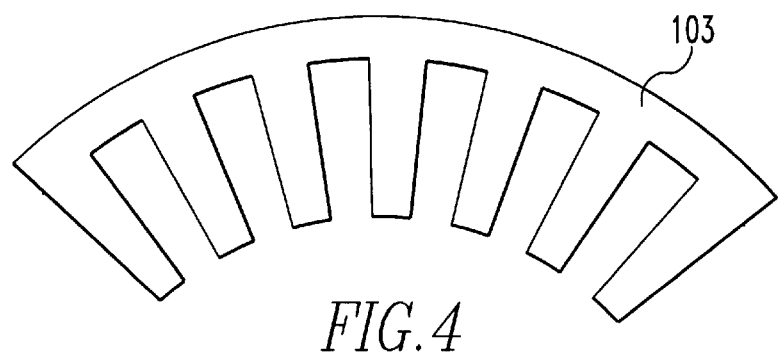
FIG. 4 shows auxiliary support profiles disposed at opposite sides of the profile strand as seen from the top of FIG. 3

FIG. 3 shows a profiled window frame 101, which consists of plastic material (PVC). Before the strand 101 is heated, profiled support members 102 are placed adjacent the profiled frame 101. These members are shaped to fit the frame 1; they consist of a plastic material, which can be heated to the shaping temperature of the PVC (110°–120° C.). After the profile strand with the support strands 102 have been heated, auxiliary support strands 103 are placed on opposite sides of the support strands 102 and are held together by spring clamps 104, which are arranged in spaced relationship along the length of the package. The auxiliary support profiles consist of polyethylene or silicon rubber. The auxiliary support profile is flexible even when cold. To improve the flexibility, the auxiliary support profiles 103 have grooves formed into their surfaces adjacent the support strands 2 as shown in FIG. 4. The auxiliary support profiles do not only hold the support profiles in firm engagement with the strand 101, but they also form a heat insulation so that the strand 101 is kept at the shaping temperature for a sufficient time to permit bending of the profiled strand 101. The whole package is bent at shaping temperature and then permitted to cool down.

After the package has cooled down, the spring clamps 104 and the auxiliary support profile members 103 are removed. Then the support profiles 102 are pulled from the profile strand 101, which is then present in a bent shape.

The support profiles 102, the auxiliary support profile members 103 and the clamps 104 can be reused for forming another profile strand.

FIG. 4 shows the auxiliary support profile 103. It is a comb-like structure with spaced teeth, which are shaped to fit the support profiles to provide support to the support profiles 102, while the whole package is being bent.

The spaced teeth provide for high flexibility of the auxiliary support profile so as to enable it to hold the support profile members 102 in firm engagement with the profiled strand during the bending procedure.

The support profiles 102 are molded or cast components, which can withstand the temperature required for the bending of the profile strand. They are relatively thin-walled so as to permit sufficient heat to pass to heat the profile strand, but sufficiently thick to retain the heat for a time sufficient to permit the bending of the profile strand. After a cool-down period subsequent to the bending procedure, and after removal of the auxiliary support profiles 103 and the support profile members 102, the profile strand 101 retains its bent shape.

At the side of the package, which is disposed during bending of the package, on a bending table, that is, the lower side of the package as shown in FIG. 3, the support profile members and also the auxiliary support profiles extend over the walls of the profile strand so that the profile strand is well supported and insulated from the support table in order to prevent excessive heat transfer to the support table and premature cooling of the profile strand. In this way, the profile strand can be maintained at a temperature sufficiently long to facilitate the bending of the profile strand.

What is claimed is:

1. A method for the arc-like shaping of a profiled strand of a thermoplastic material, said method comprising the steps of: heating at least a section of the profiled strand and of a support ledge disposed in spaced relationship from the area of the profiled strand from which the arc is to be formed in an air-circulation hot air heating chamber to a predetermined temperature facilitating the shaping, after reaching said predetermined temperature, firmly engaging said support ledge with said profiled strand at an inside arc area which is the compression side, engaging a support profile heated to a lesser degree than said support ledge with the outer side of the profile strand section to be bent to provide a packaged profiled strand, bending the packaged profiled strand of thermoplastic material, together with said support ledge and said support profile, around a template structure, plane-pressing said bent profile strand, and, after a cool-down period, separating said support ledges and support profiles from said profiled strand.

2. A method according to claim 1, wherein, in said heating chamber, the compression side of said profiled strand is subjected to a higher temperature than the tension side of said profiled strand.

3. A method according to claim 1, wherein said support ledge consists of a temperature resistant plastic material.

4. A method according to claim 3, wherein said temperature resistant plastic material is polytetrafluoroethylene (PTFE).

5. A method according to claim 1, wherein said support profile consists of a temperature resistant elastic profile rod having a smooth uninterrupted surface and having an outer side provided with a spring steel band.

6. A method according to claim 3, wherein said support ledge is thin walled and consists of at least two pieces, which, after heating, are engaged by a rubber support strip that, after being together bent, is separated from the support ledge.

7. A method for arc-like shaping of a profiled strand of a thermoplastic material, said method comprising the steps of placing support profile members of a plastic material onto the outside walls of said profile strand at least over a part of its length, which support members are adapted in shape to the shape of said profile strand, heating said profile strand with said support profile members disposed thereon to a temperature at which said profile strand can be formed, placing flexible auxiliary support member on opposite sides of said profile strand onto said support profile members, clamping said auxiliary support members together so as to firmly engage therebetween said support members and holding them in firm engagement with said profile strand thereby forming a package, bending said package with the heated profile strand disposed within, permitting said package to cool, and removing said auxiliary support profiles and then said support profile members from said bent profile strand.

8. A method according to claim 7, wherein said support profile members consist of silicon rubber and said auxiliary support profiles consist of polyethylene (PE).

9. A method according to claim 7, wherein, for bending, said package is disposed on a bending table and said support profile members and said auxiliary profiles extend on the side of said package, which is disposed during bending on said bending table, over said profile strand so as to support said profile strand and prevent rapid cooling of said profile strand at the support side adjacent said bending table.

* * * * *